United States Patent
Wang et al.

(10) Patent No.: US 9,986,256 B2
(45) Date of Patent: May 29, 2018

(54) VIRTUAL DECODED REFERENCE PICTURE MARKING AND REFERENCE PICTURE LIST

(75) Inventors: Ye-Kui Wang, Tampere (FI); Ying Chen, Tampere (FI); Miska Hannuksela, Ruutana (FI)

(73) Assignee: Nokia Technologies Oy, Espoo (FI)

( * ) Notice: Subject to any disclaimer, the term of this patent is extended or adjusted under 35 U.S.C. 154(b) by 1523 days.

(21) Appl. No.: 11/874,123

(22) Filed: Oct. 17, 2007

(65) Prior Publication Data

US 2008/0260034 A1    Oct. 23, 2008

Related U.S. Application Data

(60) Provisional application No. 60/853,185, filed on Oct. 20, 2006.

(51) Int. Cl.
| | |
|---|---|
| *H04N 19/44* | (2014.01) |
| *H04N 19/573* | (2014.01) |
| *H04N 19/52* | (2014.01) |
| *H04N 19/503* | (2014.01) |
| *H04N 19/176* | (2014.01) |
| *H04N 19/70* | (2014.01) |
| *H04N 19/61* | (2014.01) |

(Continued)

(52) U.S. Cl.
CPC ......... *H04N 19/573* (2014.11); *H04N 19/176* (2014.11); *H04N 19/31* (2014.11); *H04N 19/33* (2014.11); *H04N 19/44* (2014.11); *H04N 19/503* (2014.11); *H04N 19/52* (2014.11); *H04N 19/61* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 7,042,944 B2 | 5/2006 | van de Schaar et al. | |
| 8,315,308 B2 * | 11/2012 | Bao et al. | 375/240.12 |
| 2005/0207490 A1 * | 9/2005 | Wang et al. | 375/240.15 |

(Continued)

FOREIGN PATENT DOCUMENTS

| | | |
|---|---|---|
| EP | 2 080 378 B1 | 7/2009 |
| KR | 2006-0085148 | 7/2006 |

(Continued)

OTHER PUBLICATIONS

International Search Report for PCT Application No. PCT/IB2007/054228.

(Continued)

*Primary Examiner* — Faruk Hamza
*Assistant Examiner* — Thinh Tran
(74) *Attorney, Agent, or Firm* — Alston & Bird LLP

(57) ABSTRACT

An improved system and method for implementing efficient decoding of scalable video bitstreams is provided. A virtual decoded picture buffer is provided for each lower layer of the scalable video bitstream. The virtual decoded picture buffer stores decoded lower layer pictures for reference. The decoded lower layer pictures used for reference are compiled to create a reference picture list for each layer. The reference picture list generated by the virtual decoded picture buffer is used during a direct prediction process instead of a target reference list to correctly decode a current macroblock.

20 Claims, 7 Drawing Sheets

(51) Int. Cl.
*H04N 19/33* (2014.01)
*H04N 19/31* (2014.01)

(56) References Cited

U.S. PATENT DOCUMENTS

| | | | |
|---|---|---|---|
| 2006/0165302 A1* | 7/2006 | Han et al. | 382/240 |
| 2006/0182179 A1 | 8/2006 | Han | |
| 2006/0222079 A1 | 10/2006 | Park et al. | |
| 2007/0286283 A1* | 12/2007 | Yin et al. | 375/240.16 |

FOREIGN PATENT DOCUMENTS

| | | |
|---|---|---|
| WO | WO 2006/040413 | 4/2006 |
| WO | WO 2006/104326 | 10/2006 |
| WO | WO 2006/109154 | 10/2006 |
| WO | WO 2007/080223 | 7/2007 |
| WO | WO 2007/110741 | 10/2007 |

OTHER PUBLICATIONS

Examiner's Report for Australian Application No. 2007311489 dated Aug. 23, 2010.
English Translation of Office Action for Korean Application No. 2009-7010243 dated Aug. 11, 2010.
English translation of Office Action for corresponding Chinese Application No. 200780047444.0 dated Nov. 2, 2010.
Office Action for Chinese Application No. 200780047440.0 dated Mar. 2, 2012.
Extended European Search Report for European Patent Application No. 07826773.9, dated Oct. 28, 2010.
Office Action for Russian Patent Application No. 2009118280/09 (025099), dated Jan. 27, 2010.
Kim, S.Y., et al.; "CE3: smoothed reference prediction for SVC"; Joint Video Team (JVT) of ISO/IEC MPEG & ITU-T VCEG (ISO/IEC JTC1/SC29/WG11 and ITU-5 SG16Q.6); 17th meeting, Nice France; Oct. 2005.
Schwarz, H., et al.; "Constrained inter-layer prediction for single-loop decoding in spatial scalability"; IEEE International Conference on Image Processing; Sep. 2005.
Wiegand, T., et al.; "Output Document of JVT"; Joint Video Team (JVT) of ISO/IEC MPEG & ITU-T VCEG (ISO/IEC JTC1/SC29/WG11 and ITU-T SG16Q.6); 20$^{th}$ meeting; Klagenfurt, Austria; Jul. 2006.
Office Action for Chinese Application No. 200780047440.0 dated Apr. 3, 2013.
Substantive Examination Report for Malaysia Application No. PI 20091611 dated Sep. 28, 2012.
Office Action for Chinese Application No. 200780047440.0 dated Oct. 9, 2012.
Office Action for Indian Application No. 2657/DELNP/2009 dated Jun. 19, 2015.
Korean Search Report/Examination Report for Application No. UAE/P/0351/2009 (dated Jun. 7, 2015).
Written Opinion for International Application No. PCT/IB2007/054228 dated Feb. 5, 2008, 6 pages.
Examiner's Report for Australian Patent Application No. 2007311489 dated Oct. 321, 2011.

* cited by examiner

VIRTUAL DECODED REFERENCE PICTURE MARKING AND REFERENCE PICTURE LIST

FIELD OF INVENTION

The present invention is generally related to scalable video coding. Specifically, the present invention is directed to reference picture management for single-loop decoding of scalable video signals.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Scalable coding produces scalable media bitstreams, where a bitstream can be coded in multiple layers and each layer together with the required lower layers is one representation of the media sequence at a certain spatial resolution or temporal resolution or at a certain quality level or some combination of the three. A portion of a scalable bitstream can be extracted and decoded at a desired spatial resolution or temporal resolution or a certain quality level or some combination of the three. A scalable bitstream contains a non-scalable base layer and one or more enhancement layers. An enhancement layer may enhance the temporal resolution (i.e., the frame rate), the spatial resolution, or simply the quality of the video content represented by a lower layer or part thereof. In some cases, data in an enhancement layer can be truncated after a certain location, or even at arbitrary positions, where each truncation position may include additional data representing increasingly enhanced visual quality. The latest SVC specification is described in JVT-T201, "Joint Draft 7 of SVC Amendment," 20th JVT Meeting, Klagenfurt, Austria, July 2006 (hereinafter "H.264/AVC").

In some cases of SVC, data in an enhancement layer can be truncated after a certain location, or at arbitrary positions, where each truncation position may include additional data representing increasingly enhanced visual quality. Such scalability is referred to as fine-grained (granularity) scalability (FGS). In contrast to FGS, the scalability provided by those enhancement layers that cannot be truncated is referred to as coarse-grained (granularity) scalability (CGS). It collectively includes the traditional quality (SNR) scalability and spatial scalability. Hereafter in this document, it is assumed that there are only CGS layers, though obviously the methods can be extended to the cases when FGS layers are also available.

For SVC single loop decoding, pictures of only the highest decoding layer are fully decoded. Therefore, as shown in FIG. 4, the current SVC specification maintains only one Decoded Picture Buffer (DPB) for the layer targeted for playback. Accordingly, a reference picture list is only constructed for the target layer. For example, for lower layers even though the memory management control operation (MMCO) and reference picture list reordering (RPLR) commands are signaled in slice headers, the decoding process ignores them.

As shown in FIG. 5, when inter-layer motion prediction is used for the current MB, the base layer motion vector and reference index are used to predict the motion vector and reference index of the current MB. The reference index signaled in the base-layer macroblock ("MB") is relative to the reference picture list of the base-layer. However, there is no decoding process specified in the current SVC specification for the derivation of the reference picture list of the base-layer coded pictures. Instead, the reference picture list of the target layer is used for the base layer when needed. Consequently, when the reference picture list of the base layer is different from the target layer, information (e.g. motion) from a wrong reference picture of the base layer may be used.

This problem may specifically occur when temporal direct mode or spatial direct mode prediction is used. For example, assume that the current MB is using inter-layer motion prediction. The collocated MB in the lower layer picture uses temporal direct mode. To obtain the motion information of the collocated lower layer MB, motion information of a lower layer picture from an earlier decoded access unit is needed. In this case, if the list position of that lower layer picture in the reference picture list of the lower layer is different from the list position of the target-layer picture having the same index in the reference picture list of the target layer, a wrong motion would be referred. Consequently, the current MB, hence the current picture of the target layer would be decoded incorrectly.

Accordingly, there is a need for a system and method for maintaining reference picture list for lower layers when decoding a SVC bitstream containing more than one scalable layer to ensure correct decoding when direct prediction modes are used for coding of the lower layers.

SUMMARY OF THE INVENTION

The present invention provides an improved system and method for implementing efficient decoding of scalable video bitstreams. In one embodiment, a virtual decoded picture buffer is provided for each lower layer of the scalable video bitstream. In a more particular embodiment, the virtual decoded picture buffer stores virtual decoded lower layer pictures for which the motion information may be used for motion information prediction. A virtual decoded lower layer picture is not associated with decoded sample values. In another embodiment, the virtual decoded lower layer pictures used for reference are compiled to create a reference picture list for the lower layer. The reference picture list generated by the virtual decoded picture buffer is used during a temporal direct mode or spatial direct mode prediction process instead of a target reference list to correctly decode a current macroblock.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Embodiments of the present invention will be described below with reference to the accompanying drawings. It should be understood that the following description is intended to describe exemplary embodiments of the invention, and not to limit the invention.

Figure 1:
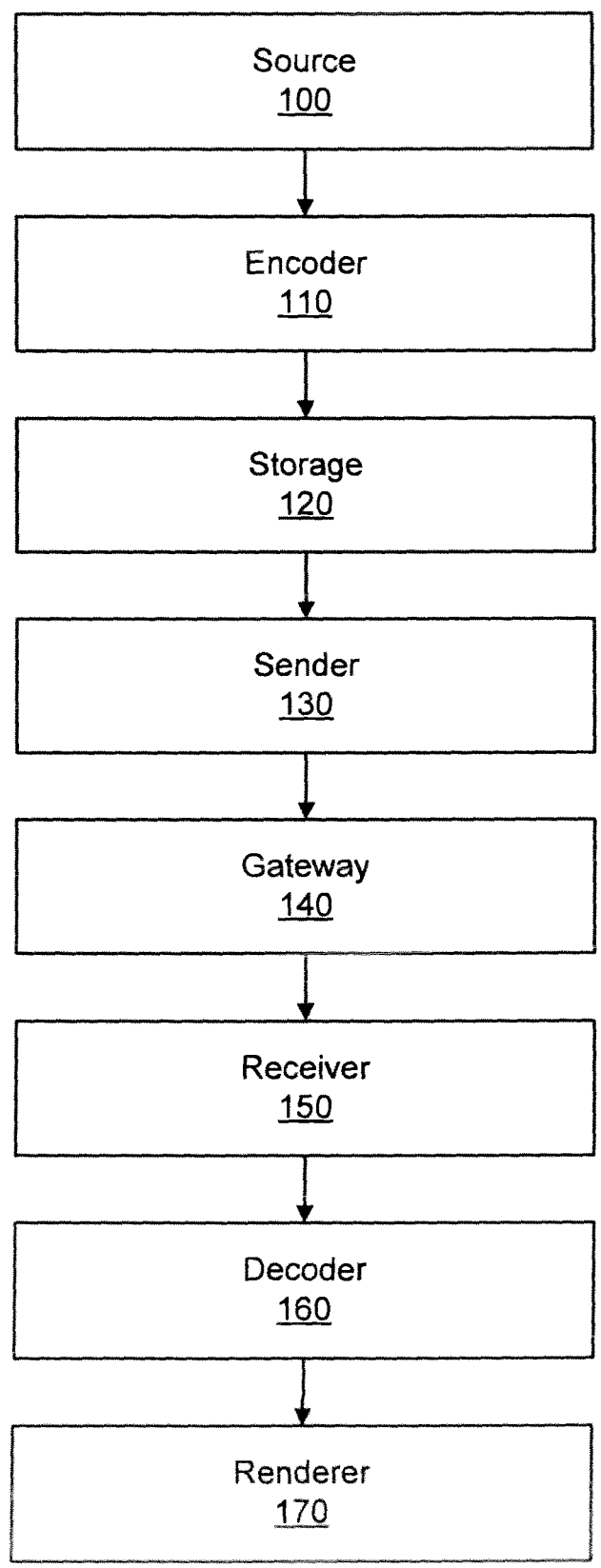
FIG. 1 is an overview diagram of a system within which the present invention may be implemented.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The coded media bitstream is typically processed further by a decoder 160, whose output is one or more uncompressed media streams. It should be noted that the bitstream to be decoded can be received from a remote device located within virtually any type of network. Additionally, the bitstream can be received from local hardware or software. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

It should be understood that, although text and examples contained herein may specifically describe an encoding process, one skilled in the art would readily understand that the same concepts and principles also apply to the corresponding decoding process and vice versa. It should be noted that the bitstream to be decoded can be received from a remote device located within virtually any type of network. Additionally, the bitstream can be received from local hardware or software.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
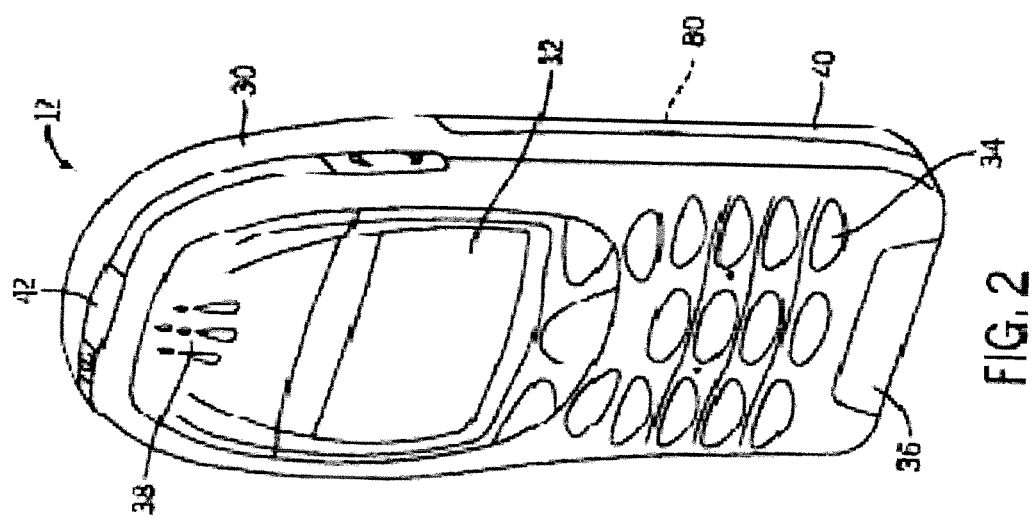
FIG. 2 is a perspective view of a mobile telephone that can be used in the implementation of the present invention.
Figure 3:
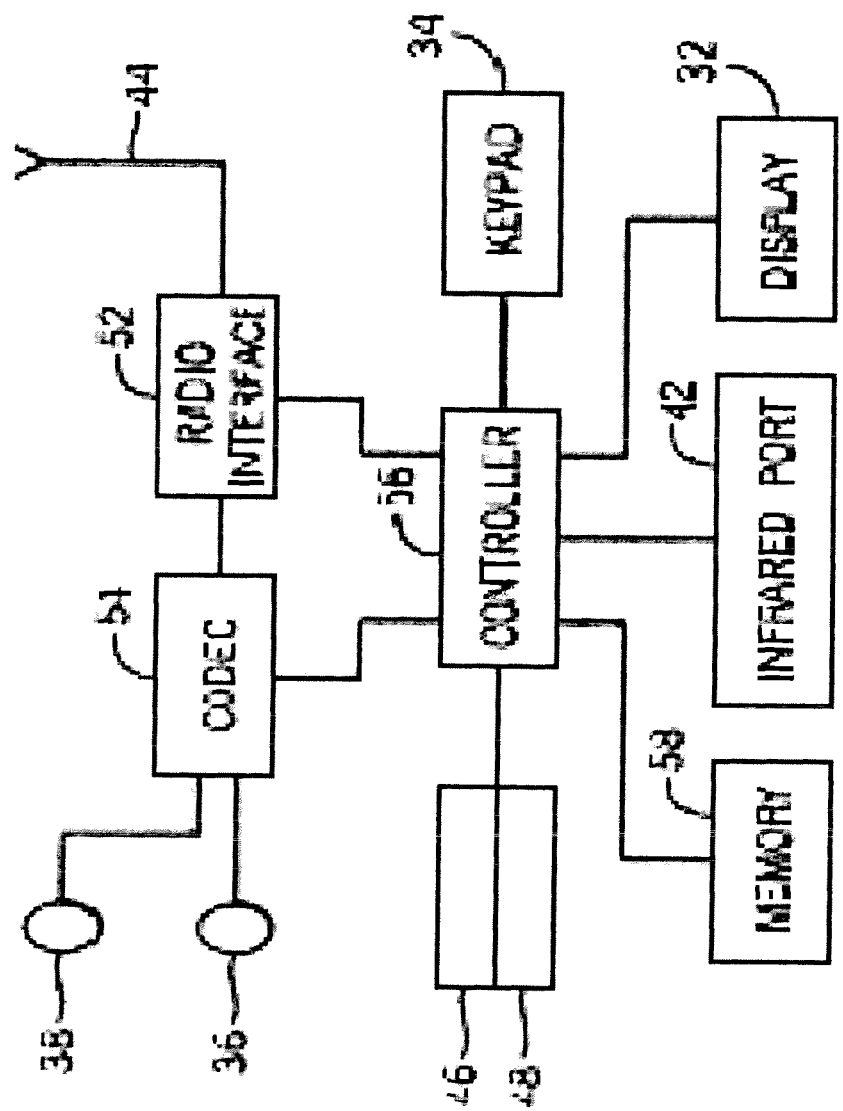
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 6:
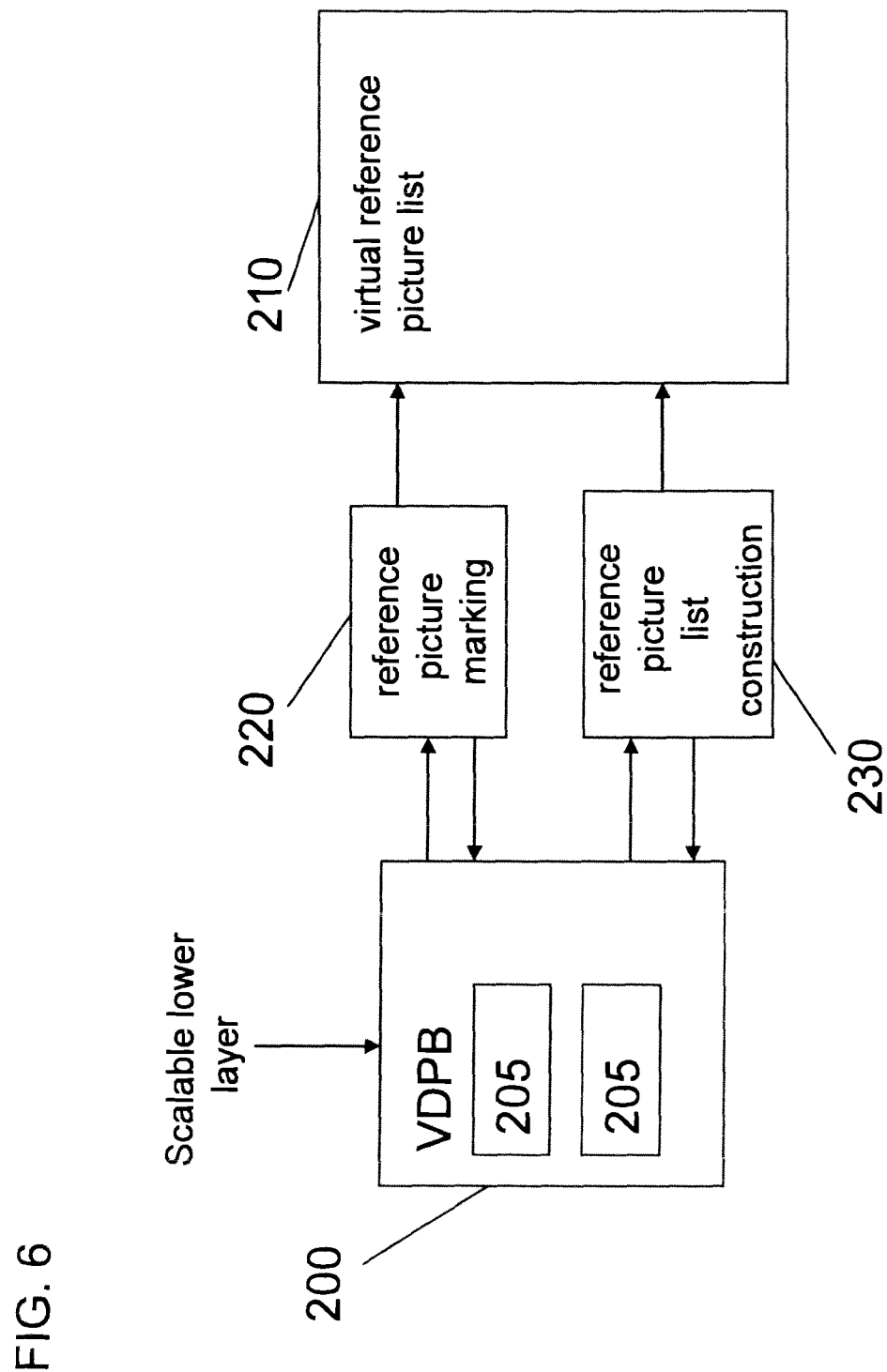
FIG. 6 is a block diagram of a system and method for virtual decoded reference picture marking and reference picture list construction.

According to one embodiment of the invention, FIG. 6 is a block diagram of a system and method for maintaining reference picture lists for lower layers in a scalable video bitstream to ensure correct decoding when direct prediction modes (temporal or spatial) are used for decoding the lower layers of the scalable bitstream.

Figure 4:
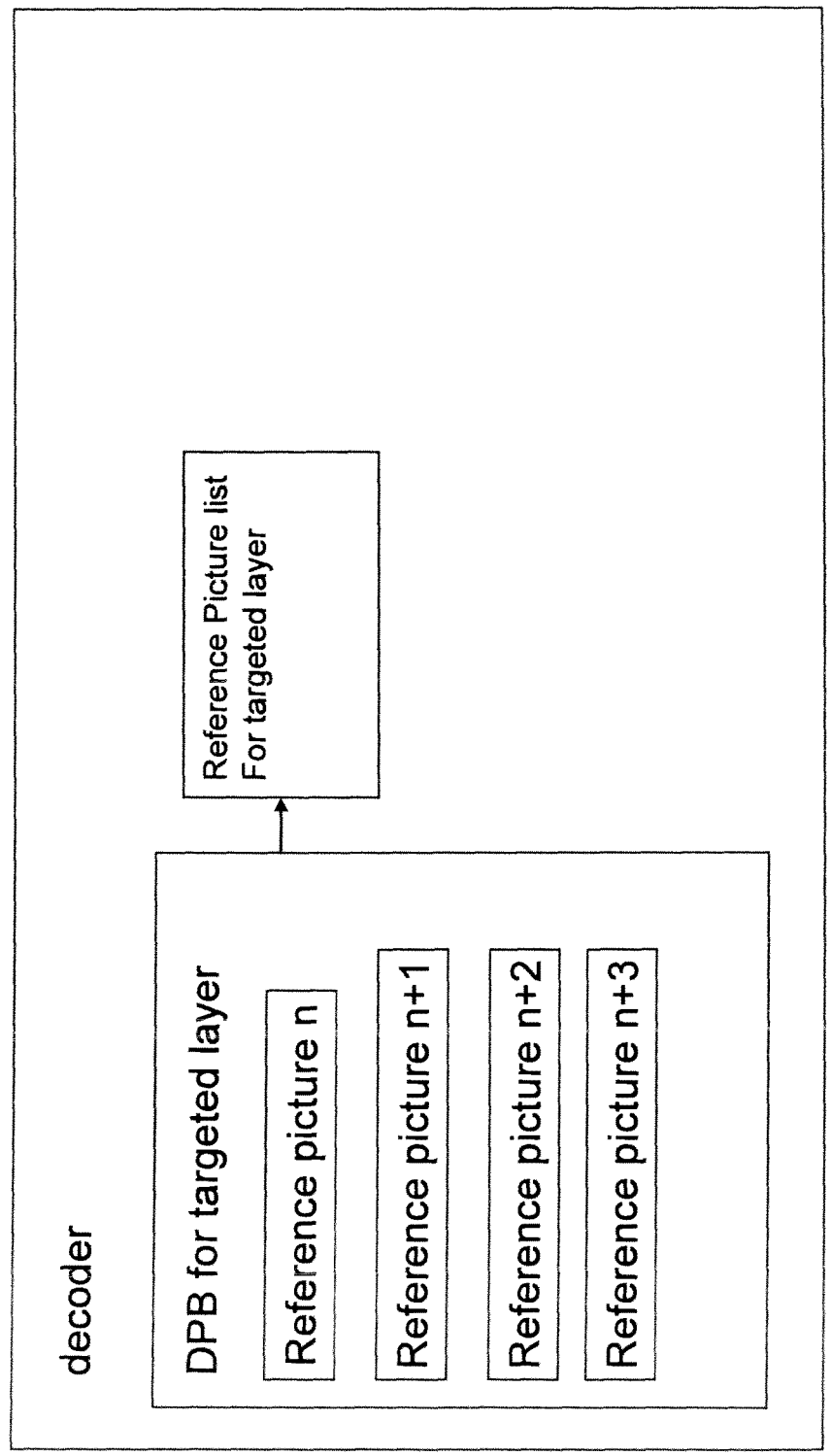
FIG. 4 is a block diagram of a decoded picture buffer and reference picture list.
Figure 5:
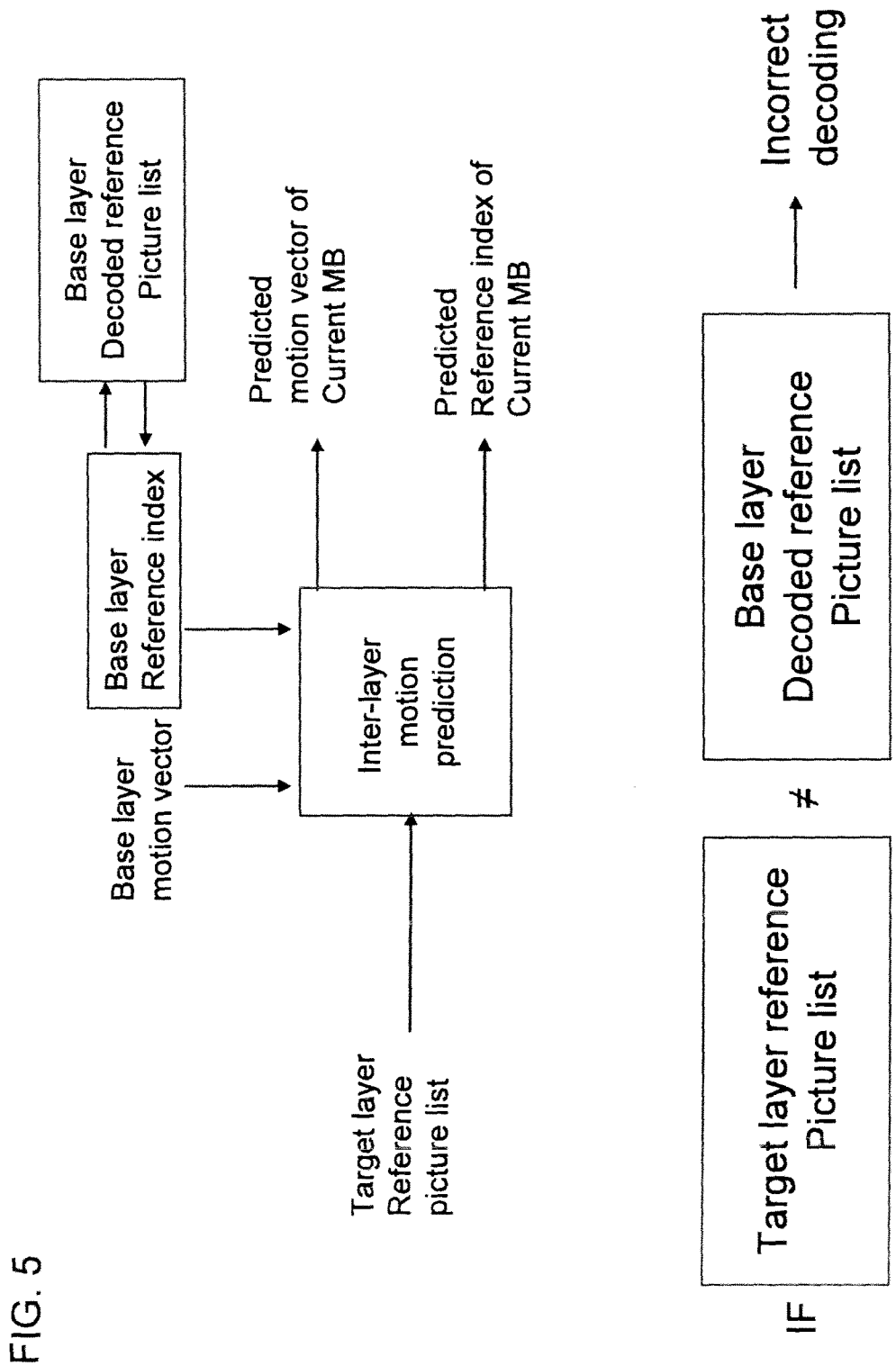
FIG. 5 is a block diagram illustrating inter-layer motion prediction.

First, a virtual decoded picture buffer (VDPB) 200 is provided for each lower layer of the scaleable video bitstream. According to one embodiment, the VDPB 200 is a virtual buffer that holds decoded lower layer pictures 205 for reference. The VDPB 200 is appropriate for storing the decoded lower layer pictures 205 because the sample values for each decoded lower layer picture are not required. The decoded lower layer pictures 205 may be used for predicting motion information of coded pictures in subsequent access units. According to one embodiment, each decoded lower layer picture 205 stored in the VDPB is referred to as a virtual reference picture 205. Each virtual reference picture 205 is associated with information as specified in H.264/AVC. This information is the same information that non-virtual reference pictures shown in FIG. 4 are associated with. However, according to one embodiment, the virtual reference pictures are not associated with sample values. In addition, the VDPB does not store non-reference lower layer pictures. Further, none of the reference pictures stored in the VDPB are marked as "unused for reference."

According to one embodiment, a virtual reference picture list 210 of the virtual reference pictures 205 is derived from the VDPB 200. To maintain the reference picture list for each of the lower layers, the decoding process as specified in SVC is applied as if the lower layer was the target layer except that the samples are not decoded. The decoding process involves a reference picture marking process 220 and the reference picture list construction process 230.

According to one embodiment, the reference picture marking process 220 is carried out as specified in SVC as if the subject lower layer was the target layer. The process for reference picture marking in SVC is summarized as follows. The maximum number of reference pictures used for inter prediction, referred to as M, is indicated in the active sequence parameter set. When a reference picture is decoded, it is marked as "used for reference". If the decoding of the reference picture caused more than M pictures marked as "used for reference," at least one picture must be marked as "unused for reference." As stated above, if a picture has been marked as "unused for reference" it does not appear in the virtual reference picture list 210. Further, based on whether the reference picture is deemed short-term or long-term, different list initialization and reordering processes are applied to the reference picture.

Figure 7:
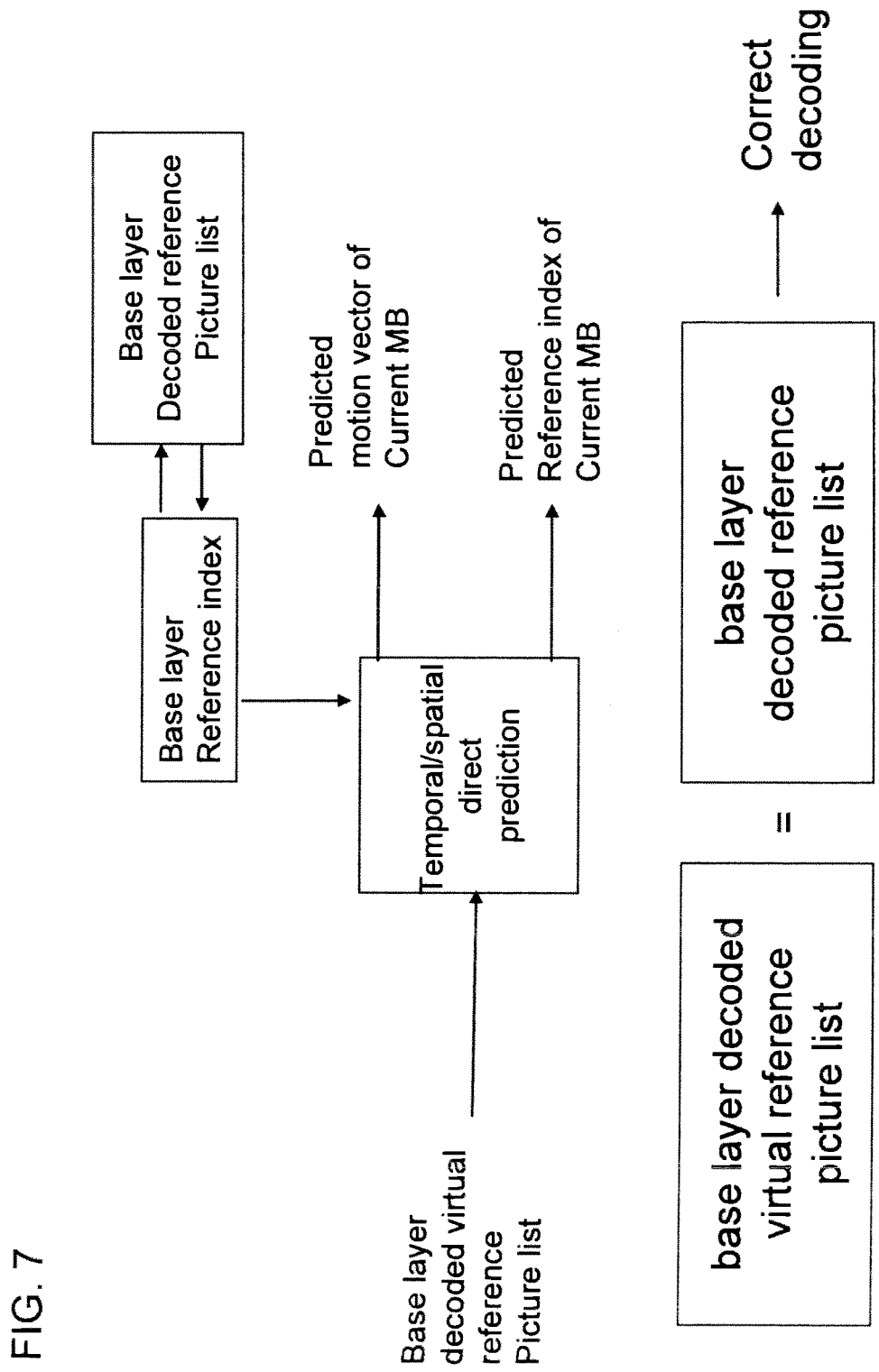
FIG. 7 is a block diagram illustrating temporal direct mode or spatial direct mode prediction according to one embodiment.

In addition, according to one embodiment, the reference picture list construction process 230 is carried out as specified in SVC as if the subject lower layer was the target layer. As a result, a reference picture list for lower layers of a scalable bitstream is maintained. Thus, as shown in FIG. 7, when direct prediction (temporal or spatial) is employed the system uses the virtual reference picture list 210 of the lower layer being decoded. This ensures that a macroblock is decoded correctly.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A method comprising:
 decoding an enhancement layer of a scalable bitstream;
 constructing a reference picture list for the decoded enhancement layer;
 constructing a reference picture list for each layer lower than the decoded enhancement layer independently from the reference picture list for the decoded enhancement layer, wherein sample values for the pictures of each lower layer are not decoded and the reference picture list representing the pictures of each lower layer is not associated with decoded sample values;
 performing a reference picture marking for the decoded enhancement layer; and
 performing a reference picture marking for each layer lower than the decoded enhancement layer independently from the reference picture marking for the decoded enhancement layer.

2. A method according to claim 1, the method further comprising: performing an inter-layer motion prediction for a block of the enhancement layer from motion vectors of a co-located block of the lower layer, wherein the colocated block of the lower layer has a direct mode prediction and the motion vectors of the colocated lower layer are derived based on elements of the reference picture list for the corresponding lower layer.

3. A method according to claim 2, wherein the direct mode is a spatial direct mode.

4. A method according to claim 2, wherein the direct mode is a temporal direct mode.

5. A method comprising:
encoding an enhancement layer of a scalable bitstream;
constructing a reference picture list for the encoded enhancement layer;
constructing a reference picture list for each layer lower than the encoded enhancement layer independently from the reference picture list for the encoded enhancement layer, wherein sample values for the pictures of each lower layer are not decoded and the reference picture list representing the pictures of each lower layer is not associated with encoded sample values;
performing a reference picture marking for the encoded enhancement layer; and
performing a reference picture marking for each layer lower than the encoded enhancement layer independently from the reference picture marking for the encoded enhancement layer.

6. A method according to claim 5, the method further comprising:
performing an inter-layer motion prediction for a block of the enhancement layer from motion vectors of a co-located block of the lower layer, wherein the colocated block of the lower layer has a direct mode prediction and the motion vectors of the colocated lower layer are derived based on elements of the reference picture list for the corresponding lower layer.

7. A method according to claim 6, wherein the direct mode is a spatial direct mode.

8. A method according to claim 6, wherein the direct mode is a temporal direct mode.

9. A decoder configured to decode an enhancement layer of a scalable bitstream, comprising:
a reference picture list construction module for
constructing a reference picture list for the decoded enhancement layer;
constructing a reference picture list for each layer lower than the decoded enhancement layer independently from the reference picture list for the decoded enhancement layer, wherein sample values for the pictures of each lower layer are not decoded and the reference picture list representing the pictures of each lower layer is not associated with decoded sample values;
performing a reference picture marking for the decoded enhancement layer; and
performing a reference picture marking for each layer lower than the decoded enhancement layer independently from the reference picture marking for the decoded enhancement layer.

10. A decoder according to claim 9, the decoder further comprises:
a module for performing an inter-layer motion prediction for a block of the enhancement layer from motion vectors of a co-located block of the lower layer, wherein the co-located block of the lower layer has a direct mode prediction and the motion vectors of the co-located lower layer are derived based on elements of the reference picture list for the corresponding lower layer.

11. A decoder according to claim 10, wherein the direct mode is a spatial direct mode.

12. A decoder according to claim 10, wherein the direct mode is a temporal direct mode.

13. An encoder configured to encode an enhancement layer of a scalable bitstream, comprising:
a reference picture list construction module for
constructing a reference picture list for the encoded enhancement layer;
constructing a reference picture list for each layer lower than the encoded enhancement layer independently from the reference picture list for the encoded enhancement layer, wherein sample values for the pictures of each lower layer are not decoded and the reference picture list representing the pictures of each lower layer is not associated with encoded sample values;
performing a reference picture marking for the encoded enhancement layer; and
performing a reference picture marking for each layer lower than the encoded enhancement layer independently from the reference picture marking for the encoded enhancement layer.

14. An encoder according to claim 13, the encoder further comprises:
a module for performing an inter-layer motion prediction for a block of the enhancement layer from motion vectors of a co-located block of the lower layer, wherein the co-located block of the lower layer has a direct mode prediction and the motion vectors of the co-located lower layer are derived based on elements of the reference picture list for the corresponding lower layer.

15. An encoder according to claim 14, wherein the direct mode is a spatial direct mode.

16. An encoder according to claim 14, wherein the direct mode is a temporal direct mode.

17. A computer program embodied in a non-transitory computer-readable medium, the computer program executable by one or more processors, the computer program comprising instructions to cause one or more processors to perform a method comprising:
decoding an enhancement layer of a scalable bitstream;
constructing a reference picture list for the decoded enhancement layer;
constructing a reference picture list for each layer lower than the decoded enhancement layer independently from the reference picture list for the decoded enhancement layer, wherein sample values for the pictures of each lower layer are not decoded and the reference picture list representing the pictures of each lower layer is not associated with decoded sample values;
performing a reference picture marking for the decoded enhancement layer; and
performing a reference picture marking for each layer lower than the decoded enhancement layer independently from the reference picture marking for the decoded enhancement layer.

18. A computer program product according to claim 17, wherein the method further comprises:
performing an inter-layer motion prediction for a block of the enhancement layer from motion vectors of a co-located block of the lower layer, wherein the co-located block of the lower layer has a direct mode prediction and the motion vectors of the co-located lower layer are derived based on elements of the reference picture list for the corresponding lower layer.

19. A computer program product according to claim 18, wherein the direct mode is a spatial direct mode.

20. A computer program product according to claim 18, wherein the direct mode is a temporal direct mode.

\* \* \* \* \*

UNITED STATES PATENT AND TRADEMARK OFFICE
CERTIFICATE OF CORRECTION

PATENT NO. : 9,986,256 B2  
APPLICATION NO. : 11/874123  
DATED : May 29, 2018  
INVENTOR(S) : Wang et al.

Page 1 of 1

It is certified that error appears in the above-identified patent and that said Letters Patent is hereby corrected as shown below:

In the Claims

<u>Column 6,</u>  
Line 63, Claim 2 "colocated" should read --co-located--.  
Line 65, Claim 2 "colocated" should read --co-located--.

<u>Column 7,</u>  
Line 26, Claim 6 "colocated" should read --co-located--.  
Line 28, Claim 6 "colocated" should read --co-located--.

Signed and Sealed this  
Nineteenth Day of February, 2019

Andrei Iancu  
*Director of the United States Patent and Trademark Office*